(12) United States Patent
Moradians

(10) Patent No.: US 8,221,038 B1
(45) Date of Patent: Jul. 17, 2012

(54) OVERRIDABLE SIDE LOCK (STABBER) PALLET TYPE LOAD RESTRAINT

(75) Inventor: Edward Moradians, Woodland Hills, CA (US)

(73) Assignee: Angra International, LLC., Hawthorne, CA (US)

( * ) Notice: Subject to any disclaimer, the term of this patent is extended or adjusted under 35 U.S.C. 154(b) by 209 days.

(21) Appl. No.: 12/660,396

(22) Filed: Feb. 26, 2010

(51) Int. Cl.
B60P 1/64 (2006.01)
B64C 1/22 (2006.01)

(52) U.S. Cl. .......................................... 410/69
(58) Field of Classification Search .................... 410/69, 410/77, 78, 79, 80; 224/118.1, 137.1
See application file for complete search history.

(56) References Cited

U.S. PATENT DOCUMENTS

| | | | |
|---|---|---|---|
| 3,210,038 A * | 10/1965 | Bader et al. ...................... 410/77 |
| 3,262,588 A * | 7/1966 | Davidson ...................... 414/536 |
| 3,693,919 A | 9/1972 | Alberti et al. ............. 248/119 R |
| 3,693,920 A | 9/1972 | Trautman ................... 248/119 R |
| 3,698,679 A | 10/1972 | Lang et al. ................. 248/361 R |
| 3,774,551 A | 11/1973 | Sweger ......................... 105/366 |
| 3,906,870 A | 9/1975 | Alberti .......................... 105/464 |
| 3,927,622 A | 12/1975 | Voigt ............................ 105/463 |
| 4,005,788 A | 2/1977 | Ratliff ............................ 214/77 |
| 4,077,590 A | 3/1978 | Shorey ..................... 244/118 R |
| 4,089,275 A | 5/1978 | Pelletier ........................ 105/465 |
| 4,095,704 A | 6/1978 | Ratliff ............................. 214/77 |
| 4,121,789 A | 10/1978 | Lent et al. |
| 4,234,278 A * | 11/1980 | Harshman et al. .............. 410/69 |
| 4,331,412 A | 5/1982 | Graf ................................ 410/69 |
| 4,401,286 A | 8/1983 | Naffa ....................... 244/137 R |
| 4,415,298 A | 11/1983 | Voigt ............................. 410/69 |
| 4,430,032 A | 2/1984 | Morgan .......................... 410/68 |
| 4,498,823 A | 2/1985 | Trautman ........................ 410/84 |
| 4,530,483 A | 7/1985 | Nordstrom ..................... 248/500 |
| 4,583,896 A | 4/1986 | Vogg et al. ....................... 410/69 |
| 4,696,609 A | 9/1987 | Cole ................................. 410/69 |
| 4,900,204 A | 2/1990 | Summers ........................ 410/97 |
| 5,011,348 A | 4/1991 | Jensen et al. .................... 410/79 |
| 5,035,184 A | 7/1991 | Bott .............................. 104/121 |
| 5,085,326 A | 2/1992 | Russell et al. ..................... 211/4 |
| 5,090,638 A | 2/1992 | Eilenstein-Wiegmanns ............... 244/118.1 |
| 5,098,038 A | 3/1992 | Hruska et al. .............. 244/137.1 |
| 5,130,899 A | 7/1992 | Larkin et al. ................... 362/32 |
| 5,167,479 A | 12/1992 | Bott .............................. 410/121 |
| 5,169,091 A | 12/1992 | Beroth .......................... 244/122 |

(Continued)

*Primary Examiner* — H Gutman
(74) *Attorney, Agent, or Firm* — Don Finkelstein

(57) ABSTRACT

An overrideable load restraint for restraining a preselected particular type pallet load having side pockets and the restraint having a frame and a body member pivotally mounted on the frame for movement between an upright position and a retracted position and a pawl pivotally mounted on the body and the pawl pivotally moveable between an engagement position and a retracted position and the pawl having a lip extending outwardly and the lip engaging a pocket on the preselected particular type of pallet load for the body in the upright position and the pawl in the engaged position to restrain the preselected type pallet load from movement in three directions: longitudinally in the fore and aft direction, transversely in the lateral direction and vertically in the up direction. The body member is pivotally moveable to the retracted position for the condition of a pallet load, or other load, having a greater width than the preselected particular type pallet load pressing down thereon while passing thereover. Pallets without pockets, or other loads of the same transverse width as the preselected, particular type pallet will be restrained from movement in the lateral or transverse direction and will be guided by the restraints during movement in the longitudinal or fore and aft directions.

18 Claims, 10 Drawing Sheets

U.S. PATENT DOCUMENTS

| | | | |
|---|---|---|---|
| 5,178,346 A | 1/1993 | Beroth | 244/122 R |
| 5,234,297 A | 8/1993 | Wieck et al. | 410/77 |
| 5,265,991 A | 11/1993 | Herrick et al. | 410/69 |
| 5,316,242 A | 5/1994 | Eilenstein-Wiegmann | 244/137 |
| 5,346,161 A | 9/1994 | Eilenstein-Wiegmann | 244/137.1 |
| 5,370,342 A | 12/1994 | Nordstrom | 244/118.1 |
| 5,397,078 A | 3/1995 | Eilenstein-Wiegmann | 244/118.1 |
| 5,433,564 A * | 7/1995 | Sundseth | 410/77 |
| 5,486,077 A | 1/1996 | Nutting | 410/69 |
| 5,489,172 A | 2/1996 | Michler | 410/105 |
| 5,564,654 A | 10/1996 | Nordstrom | 244/118.1 |
| 5,573,359 A | 11/1996 | Moradians | 410/69 |
| 5,609,452 A | 3/1997 | Looker et al. | 410/105 |
| 5,618,139 A | 4/1997 | Graf et al. | 410/69 |
| 5,655,863 A | 8/1997 | Mundt | 410/94 |
| D388,393 S | 12/1997 | Moradians | D12/400 |
| 5,692,862 A | 12/1997 | Hilde | 410/69 |
| 5,816,758 A | 10/1998 | Huber | 410/77 |
| 5,860,777 A | 1/1999 | Walsh et al. | |
| 5,871,317 A * | 2/1999 | Huber et al. | 410/79 |
| 5,888,040 A | 3/1999 | Walsh et al. | 410/100 |
| 5,957,406 A | 9/1999 | Nelson et al. | 244/118.1 |
| 6,007,282 A | 12/1999 | Mundt | 410/94 |
| 6,015,250 A | 1/2000 | Walsh | 410/100 |
| 6,039,519 A | 3/2000 | Jones et al. | 410/69 |
| 6,193,453 B1 | 2/2001 | Kernkamp | 410/79 |
| 6,213,696 B1 | 4/2001 | Austin | 410/106 |
| 6,238,154 B1 | 5/2001 | DaPrato | 410/151 |
| 6,270,300 B1 | 8/2001 | Huber | 410/69 |
| 6,318,938 B1 | 11/2001 | Araujo | 410/79 |
| D458,210 S | 6/2002 | Kanczuzewski et al. | 12/426 |
| 6,413,029 B1 | 7/2002 | Kernkamp | 410/79 |
| 6,425,717 B1 | 7/2002 | Saggio et al. | 410/79 |
| 6,450,744 B1 | 9/2002 | Gilhuys et al. | 410/69 |
| 6,485,238 B2 | 11/2002 | Segura | 410/69 |
| 6,485,239 B2 | 11/2002 | Afful | 410/80 |
| 6,533,513 B2 | 3/2003 | Kanczuzewski et al. | 410/152 |
| D485,227 S | 1/2004 | Graham | D12/426 |
| 6,695,555 B2 | 2/2004 | Eilenstein et al. | 410/92 |
| 6,702,532 B1 | 3/2004 | Throener | 410/94 |
| 6,729,818 B1 * | 5/2004 | Yee et al. | 410/77 |
| 6,896,456 B2 | 5/2005 | Huber | 410/77 |
| 6,926,481 B2 | 8/2005 | Huber | 410/80 |
| 7,118,152 B2 | 10/2006 | Cucknell et al. | 296/37.16 |
| 7,306,416 B1 | 12/2007 | Arico | 410/94 |
| 7,429,157 B2 | 9/2008 | Schulze et al. | 410/69 |
| 7,435,043 B2 | 10/2008 | Brekken et al. | 410/69 |
| 7,452,170 B2 | 11/2008 | Girardin | 410/23 |
| 7,758,290 B2 * | 7/2010 | Boggenstall et al. | 410/80 |

* cited by examiner

OVERRIDABLE SIDE LOCK (STABBER) PALLET TYPE LOAD RESTRAINT

BACKGROUND OF THE INVENTION

1. Field of the Invention

This invention relates to load restraints and more particularly to the restraint of preselected particular pallet type loads and is particularly applicable to the preselected pallet type loads carried on various transportation vehicles such as cargo aircraft and in which pallet type loads other than the preselected particular pallet type load may pass over the restraint without damage to the pallet or the restraint.

2. Description of the Prior Art

Various transportation vehicles, such as large cargo carrying aircraft, are often required to carry a variety of loads. It is current practice to have such loads placed on pallets. The pallets are often loaded onto the aircraft from an aft loading door or a side loading door. In general, pairs of spaced apart rails are provided on the aircraft and the spacing between the pairs of rails corresponds to the width of the pallet type loads. Whether loaded from a rear door or from a side door, the pallets must be able to move on the rails in the longitudinal direction, that is, in the fore and aft directions during the loading and unloading of the pallets from the aircraft.

The rails as may be installed in an aircraft run the longitudinal length of the cargo area of the aircraft and for each width of the pallets the corresponding rails are, in general, equally spaced from the centerline of the aircraft.

The standardized pallet sizes are specified in the NAS 3610 Cargo Unit Load Devices Specification and the teaching and technology thereof are incorporated herein by reference. Thus, the width of the pallets may be, for example, eight feet, ten feet, twelve feet, and the like. The aircraft may have pairs of rails corresponding to each specified width so that the aircraft may have the capability of carrying, on the same flight, a large variety of cargos mounted on a variety of the specified width pallets. Cargo restraints may be mounted on or adjacent to the rails for each width of pallets to restrain the pallets from movement during transportation from one location to another. Generally, the movement of the pallets to be restrained is movement fore and aft, movement transverse to the fore and aft and movement in a vertical direction. Consequently, in loading and unloading the pallets, the larger width pallets or other loads must pass over the restraints mounted in the aircraft as utilized on the smaller width pallets. For efficiency it is desired that the restraints be fixed on the rails in a desired longitudinal spaced array corresponding to the longitudinal spacing of pockets or other attachment locations on each of the different pallets. Therefore, the restraints for all except the widest widths of pallets may be overriden during loading and unloading of pallets. If the restraints are removable, considerable time is wasted in installing and removing the restraints in order to allow the pallets to pass thereover. If the restraints are fixed in place, the restraints must be capable of not interfering with any pallets that pass thereover and still be able to engage the pallet which it is designed to restrain.

Further, it is often desired in many applications that the plurality of restraints placed to engage opposite sides of the particular pallet when free of restraining engagement with the pallet, act as guides for ensuring the linear movement of the particular pallet or other load of the dame width on the rails. The guiding function of the restraints is desired to allow the particular pallet or other such loads of the same width to move freely in the longitudinal directions fore and aft without rotational or twisting movement of the particular pallet or other such loads of the same width about a vertical axis or transverse movement of the pallet, that is, in transverse directions perpendicular to the fore and aft direction in order to insure smooth loading and unloading of the particular pallet.

Overridable pallet restraints heretofore proposed have not always been capable of fixed mounting on the aircraft as well as both being capable of engaging and restraining a preselected particular sized pallet for which they are designed but also not interfere with other, larger, pallets passing thereover or other loads of the same width as the particular pallets or other loads of the same transverse width. Additionally, such prior art pallet restraints often did not act as guides to enable the pallet to move only in prescribed directions along a pair of spaced apart rails.

Some of the heretofore proposed pallet restraints had the capability of being permanently mounted adjacent the track corresponding to the particular pallet to be restrained and were provided with pawls adapted to be inserted into pockets on the particular pallet to be restrained. The restraints were overrideable by loads of different configurations and/or not exactly aligned. The restraint was selectively spring biased to an upright position when not being overriden by a wider pallet. The larger pallets or other loads engaged the restraint and, while being overriden, the restraint was pivotally moved against the spring tension from an upright position downwardly into a space formed by a frame on which the restraint was mounted to a retracted position. As the larger pallets passed thereover neither the restraint or the larger pallets were damaged during such overriding movement. After the larger pallet had passed over the restraint, the restraint was pivotally moved by the spring force from the retracted position to the upright position. Some of such restraints were also manually moveable from an upright position to the retracted position and had retention means for holding the restraint in the retracted position and the retention means could be manually operated to release the restraint from the retracted position and thus allow the restraint to move under the spring force to the upright position. However, the fixed pawl of such restraints often limited the utility of the restraints in many applications.

Accordingly, It is an object of the present invention to provide an improved overridable cargo restraint.

It is another object of the present invention to provide an improved overridable cargo restraint that does not interfere with cargo pallets passing thereover.

It is another object of the present invention to provide an improved overridable cargo restraint that does not interfere with cargo pallets passing thereover but also restrains a preselected cargo pallet from movements when engaged therewith.

It is yet another object of the present invention to provide an improved overridable cargo restraint that does not interfere with cargo pallets passing thereover but also restrains a preselected cargo pallet for which it is designed to restrain and to prevent movement thereof in multiple directions.

It is another object of the present invention to provide an improved overridable cargo restraint that does not interfere with cargo pallets passing thereover but also restrains the preselected cargo pallet for which it is designed to restrain and to prevent movement thereof in longitudinal fore and aft directions, side directions and vertical directions for the restraint in a first position thereof and to act as a guide to direct the particular pallet in straight, longitudinal directions during the loading and unloading thereof to prevent rotation of the pallet about a vertical axis for the pallet in a second position thereof.

It is another object of the present invention to provide an improved overridable cargo restraint in which the pawl which is utilized to restrain a particular pallet is movable from an engaged position in which the pawl is in the pocket of the particular pallet to a retracted position in which the pawl is retracted into the restraint so as not to interfere with movements of the pallets.

SUMMARY OF THE INVENTION

The above and other objects of the present invention are achieved, in a preferred embodiment thereof by providing a frame adjacent the rail for a preselected pallet size. A plurality of the frames are in a spaced longitudinal direction and an aligned transverse direction on each of the two rails utilized for the preselected pallet. Each of the frames and the restraining members associated therewith may be substantially identical.

As utilized herein the direction of "longitudinal" refers to the directions generally fore and aft in the transport vehicle and "transverse" refers to the directions from side to side in the transport vehicle. While the preferred embodiments herein are described as utilized in a transport aircraft, as noted above the present invention is not so limited and may also be advantageously utilized in other transport vehicles.

The frames have a first mounting bar and a second mounting bar spaced transversely from the first mounting bar, a first side member and a second side member spaced longitudinally from the first side member, and the first side member and the second side member extending between the first mounting bar and the second mounting bar, the first side member, the second side member, first mounting bar and second mounting bar defining a body member receiving cavity therebetween;

A body member is pivotally mounted on the frame in the body member receiving cavity of the frame. The body member is mounted on the frame for pivotal movement between an upright position wherein the body member extends upwardly from the body member receiving cavity and a retracted position wherein the body member is substantially contained in the body member receiving cavity.

The body member is substantially rectangular and has a base portion, a top portion spaced from the base portion and a pair of spaced apart leg portions extending between the top portion and the base portion. The top portion, the base portion and the spaced apart leg portions define pawl receiving cavity therebetween;

In order to provide the pivotal movement of the body member in the frame, there is a body member axle extending through the first side member and the second side member of the frame in regions adjacent the first mounting bar and the body member axle passes through the pair of spaced apart leg portions of the body member in regions adjacent the base portion of the body member so the boy member may rotate on the body member axle.

A first spring means, which may be a torsion spring, is mounted on the body member axle and has a first end engaging the frame and a second end engaging the body member for biasing the body member into an upright position thereof in which the body member extends upwardly and away from the frame and resisting movement of the body member from the upright position thereof into a retracted position thereof where the body member is substantially contained in the body member receiving cavity.

A pawl is pivotally mounted on the body member in regions adjacent the top portion thereof for pivotal movement between an engaged position and a retracted position The pawl has a lip portion extending outwardly from the body member toward the second mounting bar when the pawl is in the engaged position. The lip portion has a load engaging lower surface which engages bottom walls of a pocket of a preselected pallet for which it is designed to prevent upward movement of the pallet. The lip portion of the pawl has side surfaces which may be in contact with or in close proximity to side walls of the pocket of the pallet to prevent or minimize longitudinal movement of the pallet. The tip of the lip portion of the pawl is be in close proximity to a back wall of the pocket of the pallet.

The present invention also eliminates or minimizes transverse movement of the pallet after installation. This is achieved by the inner surfaces of the body members and the wings of opposed pairs of restraints engaging the pallet.

The pawl also has first walls defining a first lock detent and second walls defining a second lock detent. The pawl is contained within the pawl receiving cavity of the body member when it is in the retracted position thereof;

A pawl axle extends through the pair of spaced apart leg portions of the body member in regions adjacent the top portion of the body member. The pawl axle extends through the pawl to allow the pivotal movement of the pawl between the engaged position thereof and the retracted position thereof.

A second spring means which may be a torsion spring is mounted on the pawl axle and has a first end engaging the body member and a second end engaging the pawl for biasing the pawl into the engaged position thereof and resisting movement of the pawl into the retracted position.

A lock member is pivotally mounted on the body member axle between the spaced apart leg portions of the body member. The lock member is pivotally moveable on the body member axle for pivotal movement towards and away from the pawl. The lock member has first tab means for selectively engaging and disengaging from the first wall defining the first lock detent on the pawl when the pawl is in the engaged position thereof to prevent movement of the pawl from the engaged position to the retracted position thereof.

The lock member also has a second tab means for selectively engaging and disengaging from the second wall defining the second lock detent on the pawl for the condition of the pawl in the retracted position thereof to prevent movement of the pawl from the retracted position to the engaged position. The second detent may be on the lower side of the lip portion of the pawl.

A third spring means which may be a torsion spring is mounted on the body member axle and has a first end engaging the body member and a second end engaging the lock member for biasing the lock member towards the pawl and resisting movement away from the pawl.

The preferred embodiment of the present invention has a first wing member connected to a first of the pair of leg portions of the body member in regions adjacent said top portion of the body member and extending outwardly in a first direction therefrom over the first side member of the frame and having a downwardly tapered upper surface extending from the body member towards the frame to a tip portion of the wing, and a lower surface spaced from the top surface. The tip of the first wing portion, for the condition of the body member in the upright position thereof, is no higher than the top surface of the side members. If the restraint were to be in the upright position thereof and a cargo pallet or other load of greater width than the width of the preselected particular pallet that is to be restrained by the restraint is moved in the fore or aft directions, such greater width pallet or other load in moving fore or aft in the aircraft will engage the upper surface of the wing at or near the tip and force the restraint into the retracted position thereof and the pallet may slide along the wing and on the outer surface of the body member. The first wing also has walls defining a notch on the lower surface for accepting the first side member for the body member in the retracted position.

A second wing member similar to the first wing member is connected to the second of the pair of leg portions of the body member and extends outwardly therefrom in a second direction opposite the first direction and over the second side member of the frame to a tip portion of the wing, and a lower surface spaced from the top surface. The tip of the second wing portion, for the condition of the body member in the upright position thereof, is no higher than the top surface of the side members. If the restraint were to be in the upright position thereof and a cargo pallet or other load of greater width than the width of the preselected pallet that is to be restrained by the restraint is moved in the fore and aft directions, such greater width pallet or other load in moving fore or aft in the aircraft will engage the upper surface of the second wing at or near the tip and force the restraint into the retracted position thereof and the pallet or other load may slide along the wing and on the outer surface of the body member. The second wing member also has a downwardly tapered top surface and a lower surface spaced from the top surface and the lower surface. The second wing member also has walls defining a notch therein for accepting the second of the side members of the frame for the body member in the retracted position.

In operation, a plurality of the restraints according to the principles of the present invention are mounted in a longitudinal, that is, a fore and aft spaced array wherein the spacing corresponds to the spacing of the pockets on the preselected pallet. The restraints are, in preferred embodiments of the present invention, in an aligned transverse direction adjacent the transverse rails on which the pallet slides. The restraints are preferably placed in the retracted position thereof in which the body member is contained in the body member receiving cavity of the frame member. Such positioning of the restraints may be done manually. A removable pin may be provided to extend through the frame and engage the body member to prevent the body member from rotating into the upright position thereof from the retracted position thereof. When the preselected particular pallet is to be moved into the aircraft, the pin may be removed and the restraint is positioned into the upright position with the pawl in the retraced position as the particular pallet commences movement along the rails. When the pockets of the preselected pallet are aligned with the restraints, the lock member is pivoted to move the second tab out of engagement with the second detent on the pawl and the pawl pivots into the engagement position and the lip of the pawl engages or is in close proximity to the side walls and the bottom wall of the pocket on the preselected particular pallet. The inner faces of the body member and wings of the opposed transversely aligned restraints prevent movement of the particular pallet in the transverse directions. Therefore, the pallet is secured from movement in the transverse, longitudinal and vertically up directions by the longitudinally spaced and transversely aligned restraints.

When it is desired to unload the preselected pallet, the pawl may be moved to the retracted position to free the pawl from engagement with the walls/bottom of the pocket. The pallet may then be moved in the fore/aft directions and the inner face surfaces of the wing members and the body member engage the pallet and guide the movement of the pallet in the fore/aft directions to allow the preselected pallet to be removed from the aircraft. After the pallet has been freed from the engagement position with the pawl of the restraint, the body member may be moved to the retracted position thereof and the pin may be inserted into the pin aperture in one of the side members for blocking engagement with the body member.

However, there may be occurrences wherein the body member of one or more of the restraints is left in the upright position thereof after the preselected pallet has been removed and a wider or misaligned load is moved in the longitudinal direction onto the aircraft. Such wider or misaligned load will engage the upright restraints of the present invention. The wider or misaligned load first engages the tapered surface of the wing member of the restraint and movement of the wider or misaligned load in the longitudinal direction forces the body member of the restraints of the present invention into the retracted position so the wider or misaligned load may smoothly move over the restraints of the present invention without damage to the restraints, the wider or misaligned load or the aircraft.

From the above, it can be seen that the restraint of the present invention has four main operating configurations:

Position 1. The body member is in the retracted position inside the frame and the pawl is in the engaged position and also inside the frame;

Position 2. The body member is in the upright position and the pawl is in the retracted position in side the body member;

Position 3. The body member is in the upright position and the pawl is in the engagement position, and, Position 4. The body member is retracted into the frame and the pawl is retracted into the body member.

BRIEF DESCRIPTION OF THE DRAWING

The above and other embodiments of the present invention my be more fully understood from the following detailed description taken together with the accompanying drawing wherein similar reference characters refer to similar elements throughout and in which.

DESCRIPTION OF THE PREFERRED EMBODIMENTS

Figure 1:
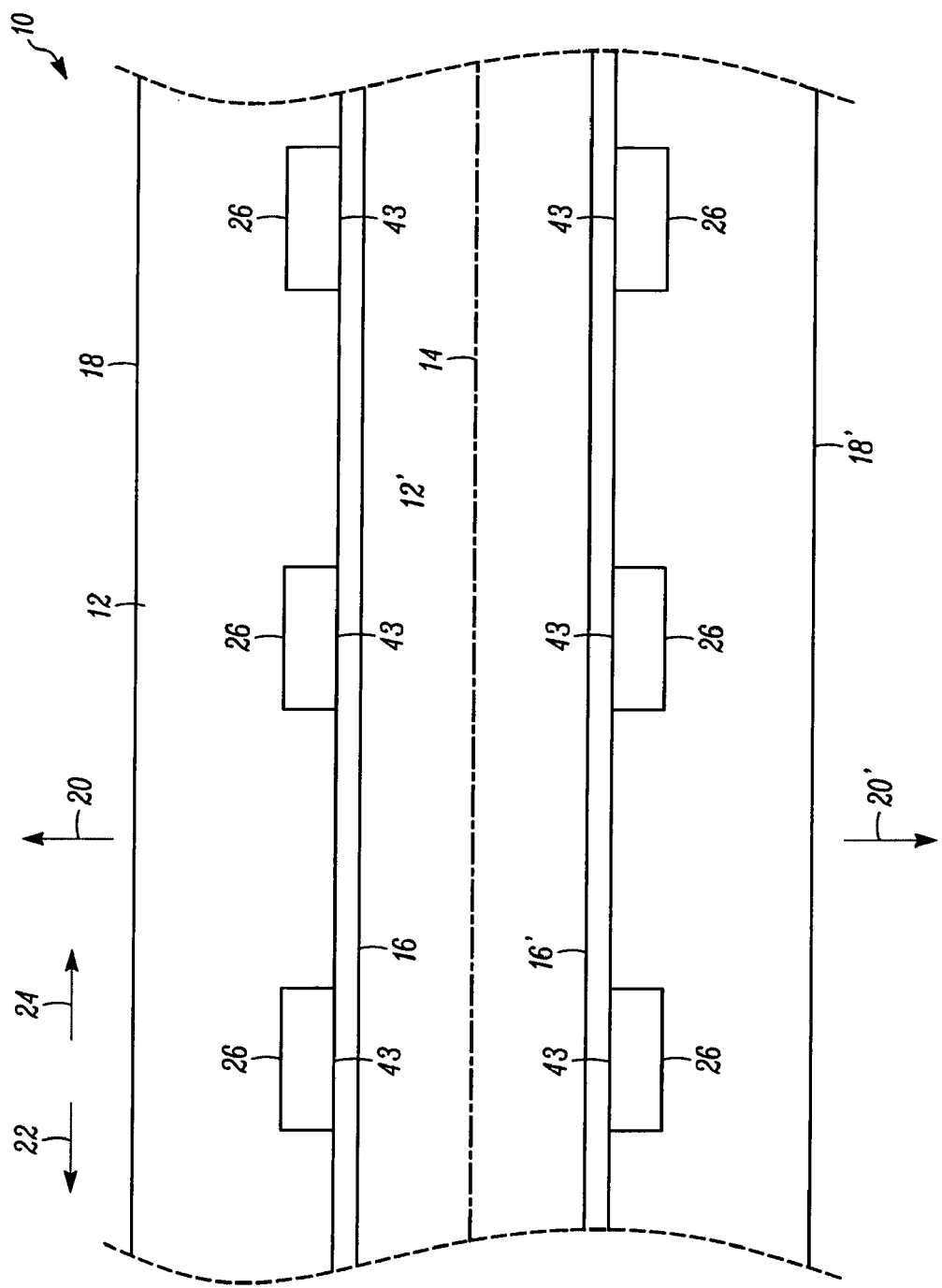
FIG. 1 is partial block diagram of a the bed of a cargo aircraft having a plurality of parallel tracks thereon on which pallets are move in longitudinal directions during loading and unloading.

Referring now to the Figures of the drawing there is illustrated therein a preferred embodiment of the present invention. In FIG. 1, there is illustrated a partial block diagram 10 of a transport vehicle generally designated 12, which may be a transport aircraft, having a loading deck 12' which is generally symmetrical about a centerline 14. A pair of rails 16-16' are provided in the loading deck 12' and upon which pallets may move in the longitudinal directions indicated by the arrow 22 in the fore direction and 24 in the aft direction. The transverse directions, that is towards and away from the sides 18 and 18' of the transport vehicle 12 are indicated by the arrows 20 and 20'.

A plurality of restraints 26, according to the principles of the present invention, are positioned adjacent the rails 16-16' in a preselected longitudinal spaced array and are aligned in a transverse spacing. The transverse spacing of the rails 16-16' corresponds to a standardized pallet width and this width defines the particular pallet to be restrained by the restraints 26. The restraints 26, when engaged with the pallets on the rails 16-16' are utilized to restrain such pallet from movement in the fore and aft directions indicated by arrows 22 and 24, from movement in the transverse directions indicted by the arrows 26 and 28 as well as movement in the vertically upward direction perpendicular to the loading deck 12'.

Figure 2:
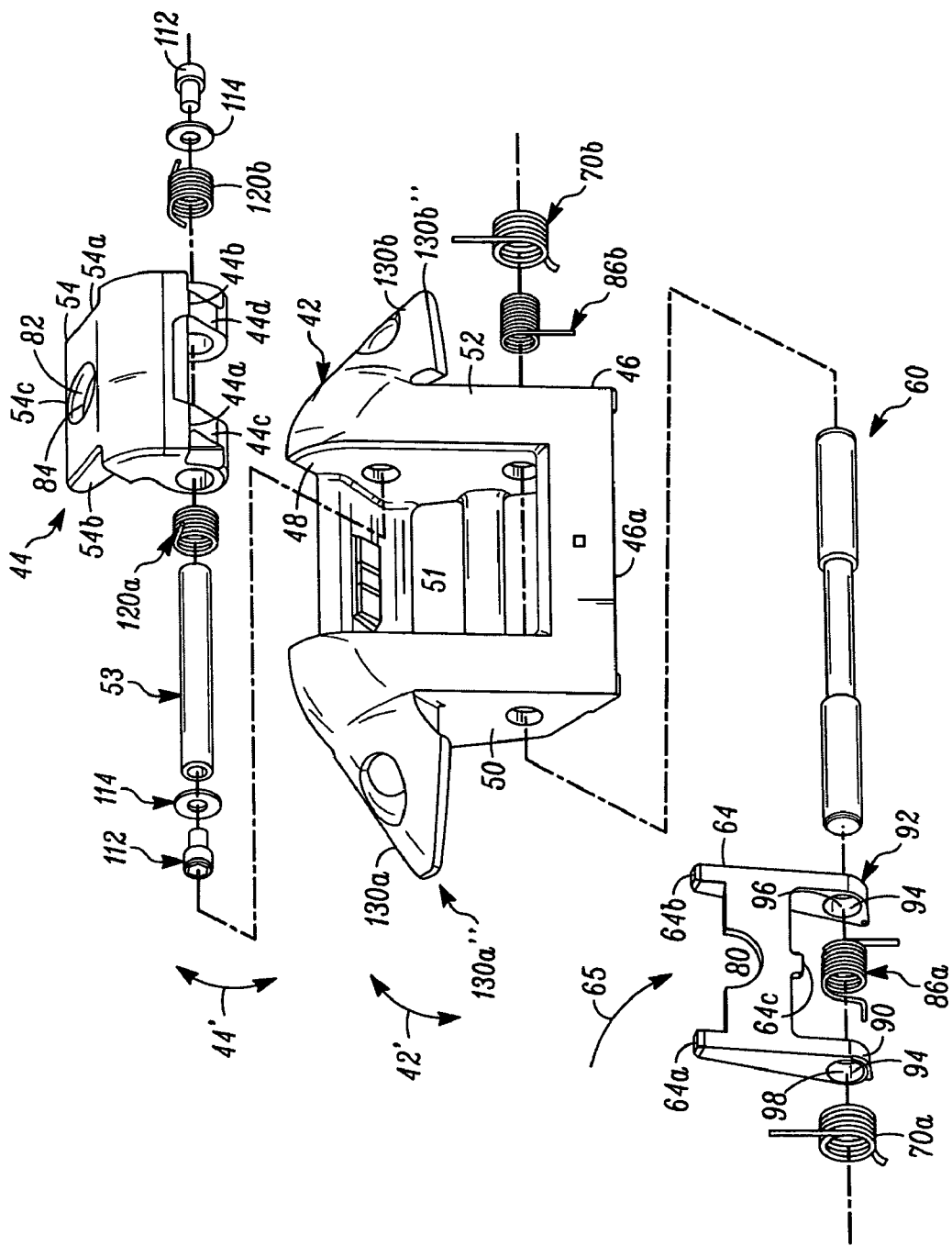
FIG. 2 is an exploded view of a restraint according to the principles of the present invention.
Figure 3:
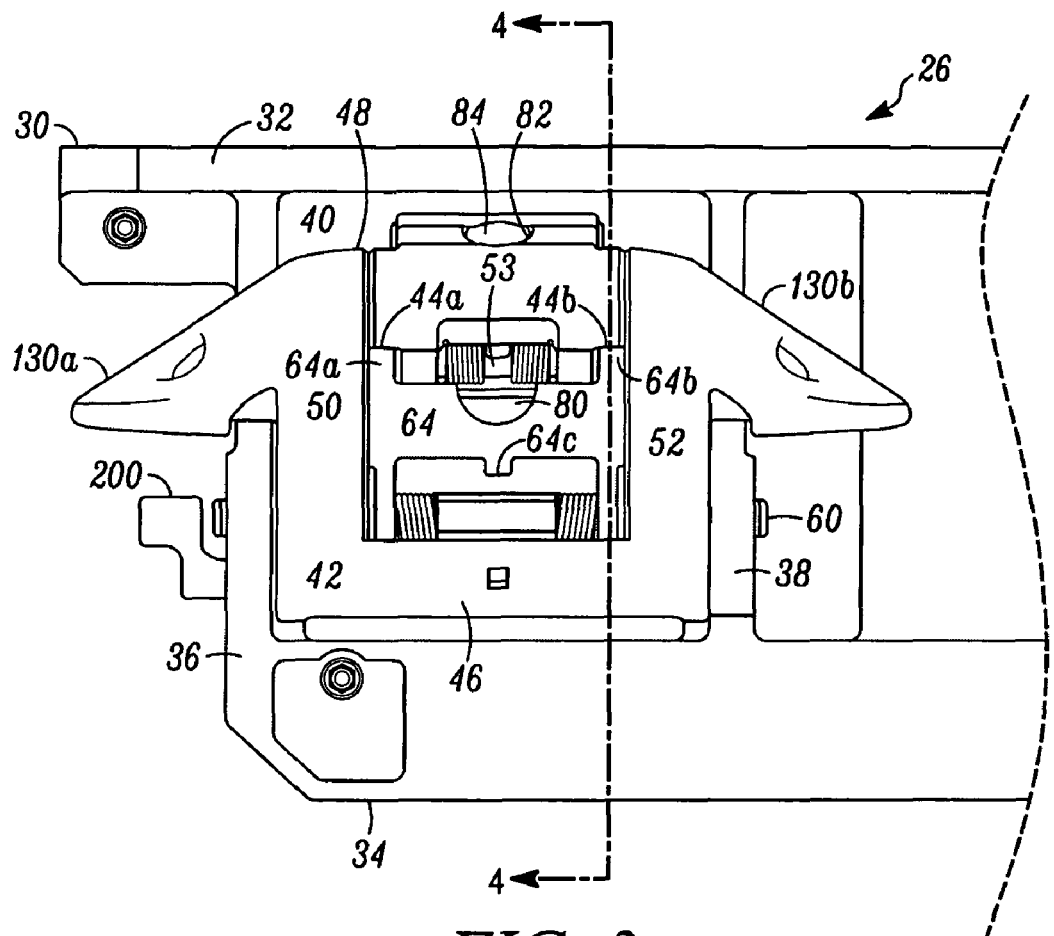
FIG. 3 illustrates the restraint of the present invention in the first position wherein the body member is in the retracted position inside the frame and the pawl is in the engaged position and also inside the frame.
Figure 4:
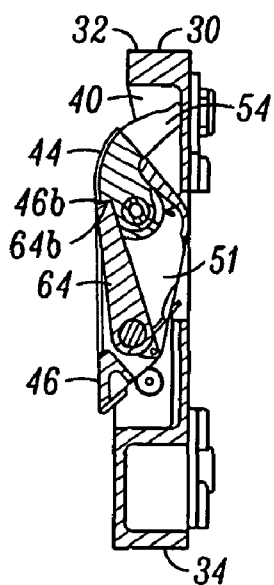
FIG. 4 is a sectional view along the line 4-4 of FIG. 3.
Figure 5:
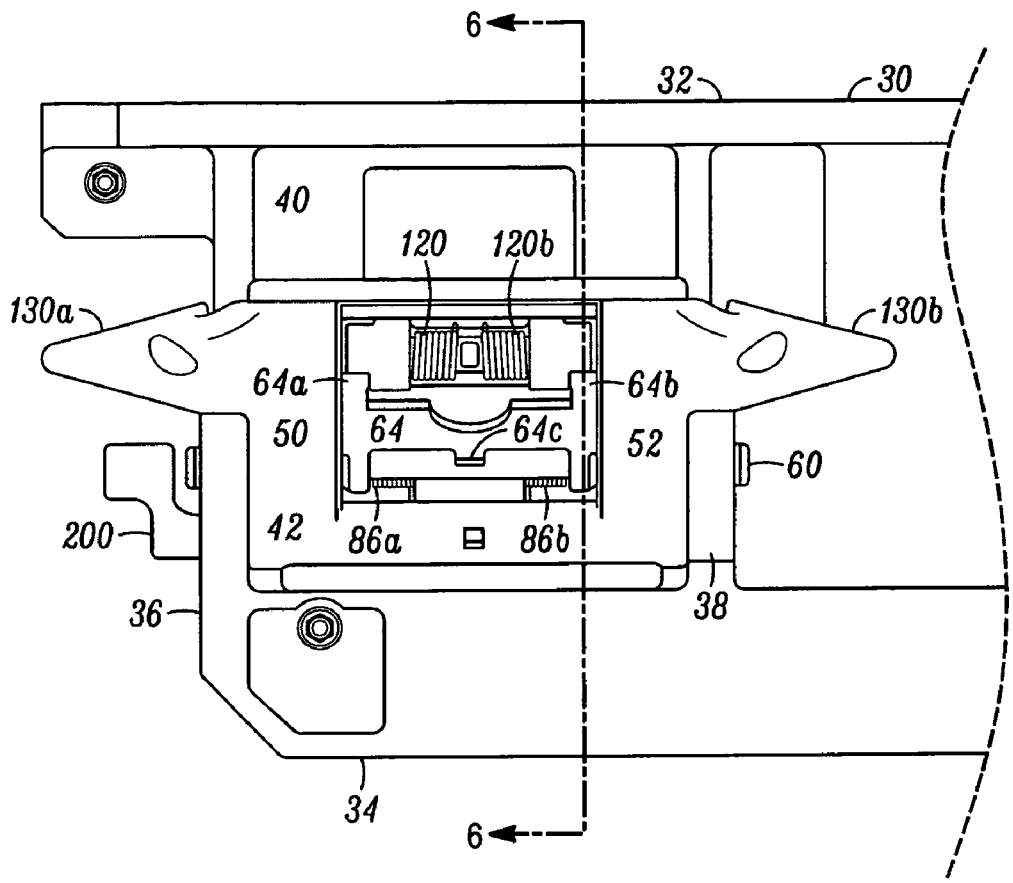
FIG. 5 illustrates the restraint of the present invention in the second position wherein the body member is in the upright position and the pawl is in the retracted position in side the body member.
Figure 6:
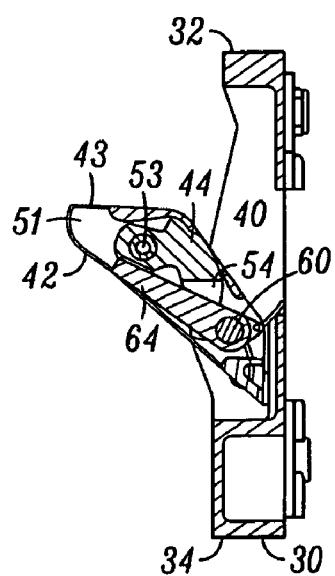
FIG. 6 is a sectional view along the line 6-6 of FIG. 5.

FIG. 2 is an exploded view of the overrideable restraint 26 which is mounted on the cargo loading deck 12' and, as shown in FIGS. 3 through 10, the restraint 26 is positioned within a frame member 30 (omitted for clarity from FIG. 2) having a first mounting bar 32 and a second mounting bar 34. When the overrideable restraint 26 is attached to the deck 12' of a transport vehicle 12 as shown in block diagram form on FIG. 1, the first mounting bar is transversely spaced from the second mounting bar 34. The frame member 30 also has a first side member 36 and a second side member 38. The first side member 36 and the second side member 38 are in longitudinal spaced relationship when installed on the cargo deck 12' of a transport vehicle 12 and both the first side member 36 and the second side member 38 extend between the first mounting bar 32 and second mounting bar 34. The first mounting bar 32, second mounting bar 34, first side member 36 and second side member 38 define an open body member receiving cavity 40 therebetween.

A body member 42 is pivotally mounted on the frame 30 on a body member axle 60 for rotational movement indicted by the arrow 42' from an upright position wherein the body member 42 extends upwardly from the frame 30 as indicted on FIGS. 5, 6, 7 and 8 to a retracted position as indicated on FIGS. 3, 4, 9 and 10 wherein the body member 42 is contained within the body member receiving cavity 40 of the frame 30. The body member 42 is shown in greater detail on FIGS. 16 and 17. The body member 42 is rectangular and has base portion 46 and a top portion indicated at 48 that is spaced from the base portion 46 and a pair of spaced apart legs 50 and 52. The spaced apart legs 50 and 52, the bottom portion 46 and top portion 48 define a pawl receiving cavity 51 therebetween for receiving the pawl 44 for the pawl in the retracted position thereof. The body member axle 60 is mounted on the frame member 30 and extends between the side member 36 and side member 38.

Figure 11:
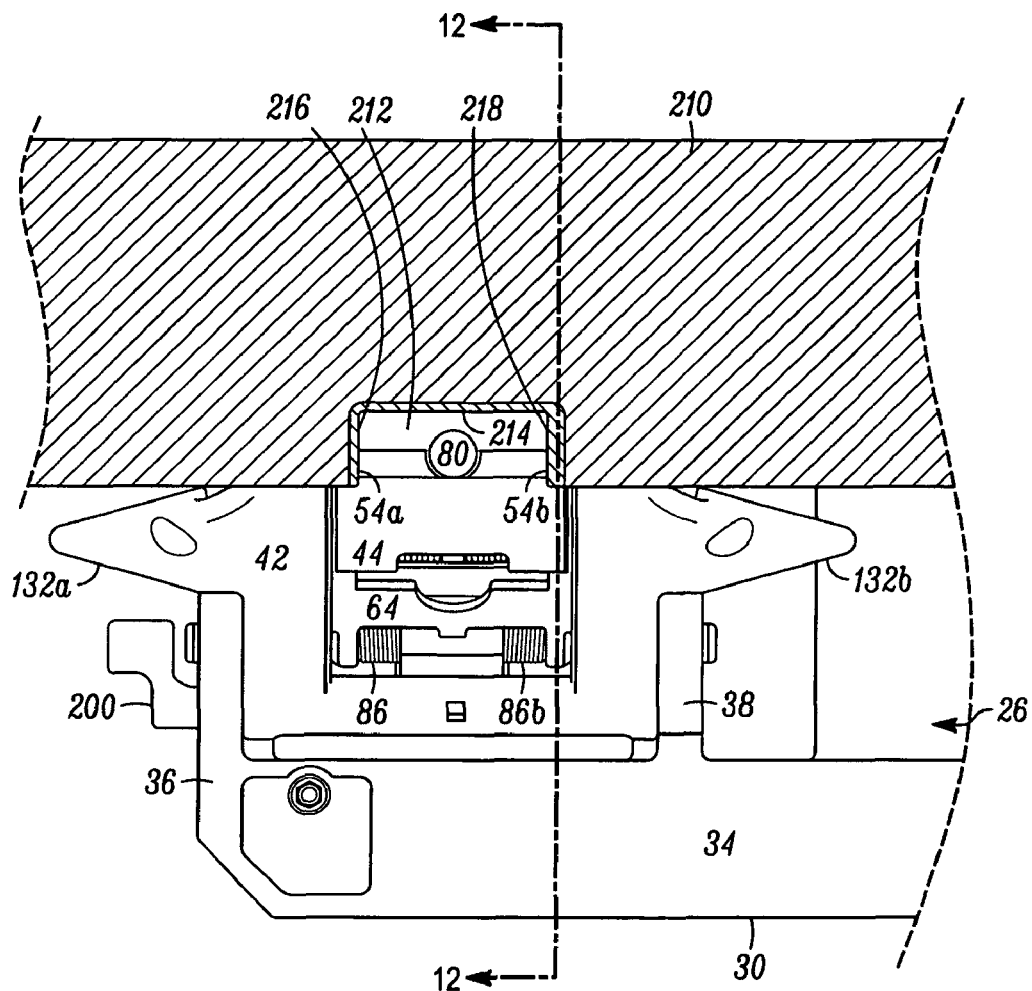
FIG. 11 illustrates the engagement of the pawl in a pocket of a particular pallet to be restrained.
Figure 12:
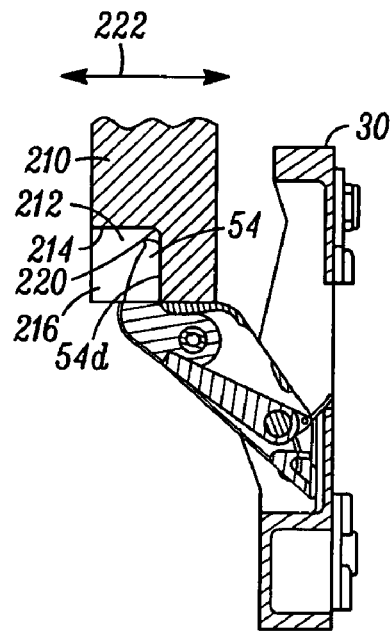
FIG. 12 is a sectional view along the line 12-12 of FIG. 11.
Figure 13:
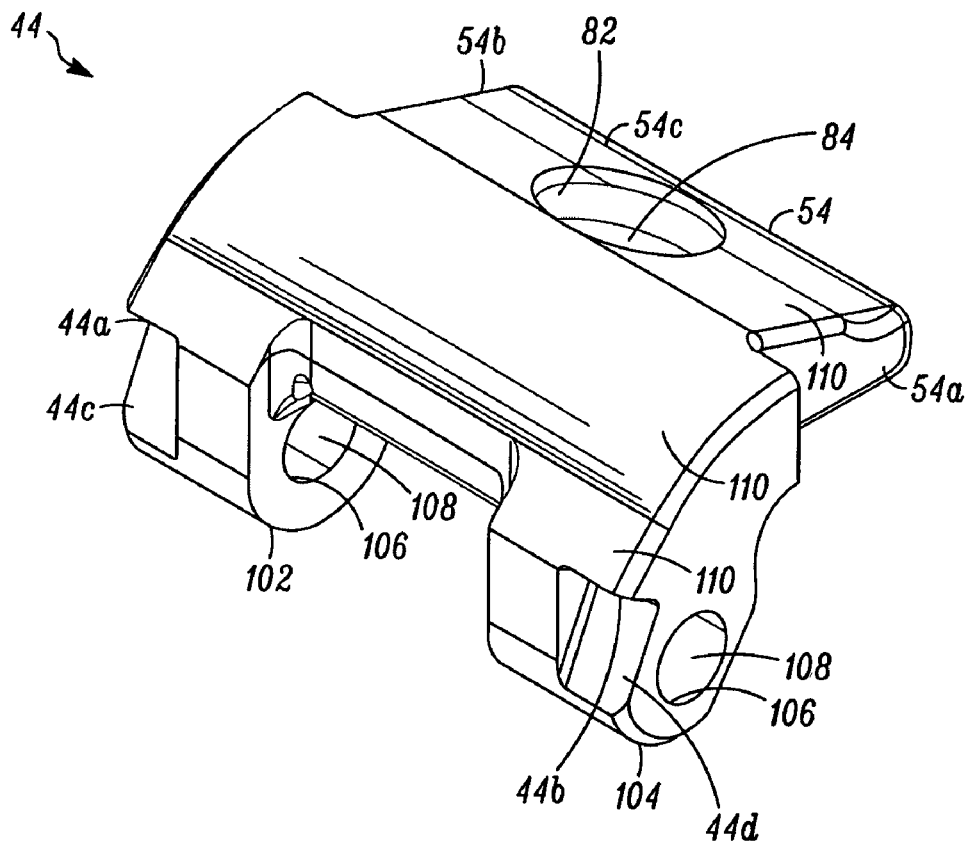
FIGS. 13, 14 and 15 illustrate the details of a pawl useful in the practice of the present invention; and, FIGS. 16 and 17 illustrate the details of a body member useful in the practice of the present invention.
Figure 14:
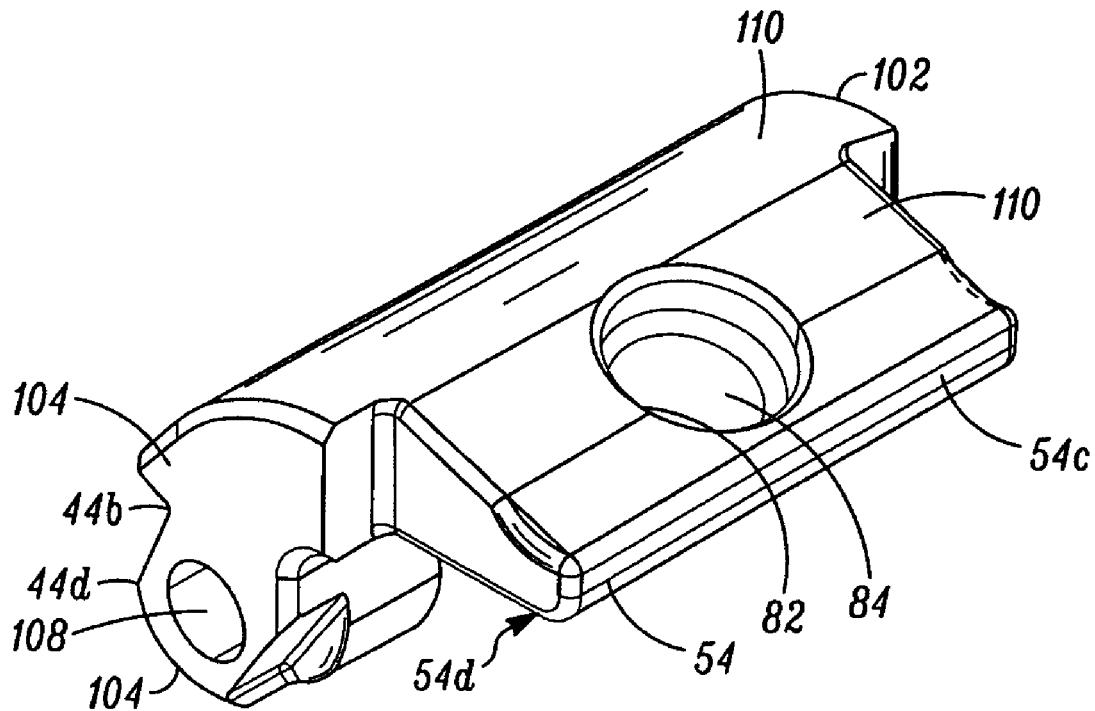
Figure 15:
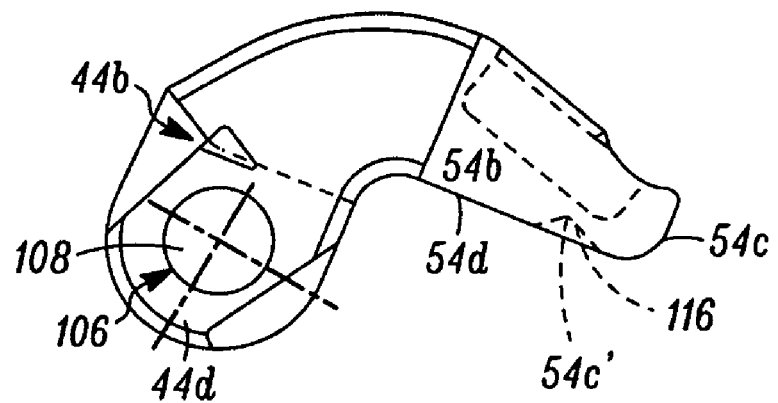

A pawl 44 is pivotally mounted on a pawl axle 53 which is mounted on the body member 42 and extends between the spaced apart side legs 50 and 52 and the pawl is shown in more detail in FIGS. 13, 14 and 15 The pawl 44 is mounted for rotational movement on the pawl axle 53 as indicated by the arrow 44' with respect to the body member 42 from an engaged position as shown in FIGS. 3, 4, 7 and 8 to a retracted position as shown in FIGS. 5, 6, 9 and 10. In the retracted position the pawl 44 is contained within the pawl receiving cavity 51 of the body member The pawl 44 has a lip 54 and in the engaged position the pawl 44 extends upwardly from the body member 42 and the lip 54 of the pawl 44 extends outwardly towards the first mounting bar 32. The pawl 44 is movable from the engaged position to a retracted position wherein the pawl 44 is contained within the pawl receiving cavity 51 of the body member 42. The pawl may be placed into the retracted position within the body member 42 when the body member 42 is in the upright position thereof or in the retracted position thereof. For the condition of the overrideable restraint 26 restraining a particular pallet, the lip 54 of the pawl 44 is positioned within a pocket of the particular pallet as shown in FIGS. 11 and 12 and the under side of the lip 54 engages a bottom surface of the pocket and the sides 54a and 54b engage or are in close proximity to side surfaces of the pocket and the forward edge 54c of the lip 54 is in close proximity to a back surface of the pocket. This engagement of the pawl with the surfaces of the pocket restrains the pallet from moving in fore and aft directions and vertical directions away from the cargo deck 12' of transport vehicle 12.

In order to prevent pivotal movement of the body member 42 which would move the lip 54 of the pawl 44 out of engagement with the pocket of the pallet, in preferred embodiments of the present invention the lower edge 46a of the bottom portion 46 of the body member 42 engages the second mounting bar 34 when the body member is in the upright position.

A generally H shaped lock member 64 is provided in the overrideable restraint 26 and is mounted on the body member axle 60 and is positioned in the pawl receiving cavity 51 of the body member 42. The lock member 64 has a pair of upper tabs 64a and 64b which are positioned to engage shoulders 44a and 44b on the pawl 44 for the condition of the pawl 44 in the engagement position thereof for the body member 42 in both the upright position and the retracted position. The lock member 64 also has a lower tab 64c which engages a detent 54c on the lower surface of the lip 54 of pawl 44 when the pawl is in the retracted position to restrain the pawl 44 in the retracted position.

The lock member 64 may be provided with a cutout 80. The cutout 80 allows manual manipulation of the lock 64 for pivotal movement on the body axle 60 between the position wherein the tabs 64a and 64b engage the shoulders 44a and 44b of the pawl 44 and the position wherein the tab 64c engages the detent 116 defined by first walls 54c' on the underside of the lip 54c of the lip 54 of the pawl 44. The pawl 44 may be provided with walls 82 defining an aperture 84 through the lip 54 to allow manual manipulation of the pawl 64 in the directions of the arrow 42'.

The lock member 64 has spaced apart bosses 90 and 92 and the bosses 90 and 92 have walls 94 defining apertures 96 and 98 through which the body axle 60 passes. The body member axle may have retaining rings 100 and 102 to restrain the body member axle in the apertures 96 and 98.

As shown most clearly on FIGS. 13 and 14, the pawl has spaced apart side bosses 102 and 104. The bosses 102 and 104 have walls 106 defining an aperture 108 therethrough. The pawl axle 53 is positioned in the apertures 108 and is retained thereon by a pair of screw caps 112 and washers 114 as shown in FIG. 2. As noted above, the underside 54d of the lip 54 of the pawl 44 is provided with the first walls 54c' defining the detent 116 into which the lower tab 64c of the lock member 64 is positioned to restrain the pawl 64 into the engagement position thereof.

The overrideable restraint 26 is provided with a first pair of spring members 70a and 70b, which may be spiral torsion springs, and the spring members 70a and 70b are mounted on the body axle 60 and engage the frame 30 and the body member 42. The spring members 70a and 70b bias the body member 42 into the upright position thereof and resist movement of the body member 42 from the upright position to the retracted position.

The overrideable restraint 26 is also provided with a second pair of spring means 120a and 120b mounted on the pawl axle 53 and engaging the pawl 44 ad the body member 42. The second set of springs 120a and 120b may be spiral torsion springs and bias the pawl 44 into the engagement position thereof and resist movement of the pawl 44 into the retracted position thereof.

The overrideable restraint 26 may also be provided with third spring means 86a and 86b mounted on the body axle and engaging the body member 42 and the lock member 64 to bias the lock member 64 towards the pawl 44 for positioning the upper tabs 64a and 64b into engagement with the shoulders 44a and 44b of the pawl 44 and resist movement of the lock member 44 away from the pawl 44. The channels 44c and 44d on the pawl 44 provide clearance for the tabs 64a and 64b as the pawl is moved from the engagement position to the retracted position.

Figure 16:
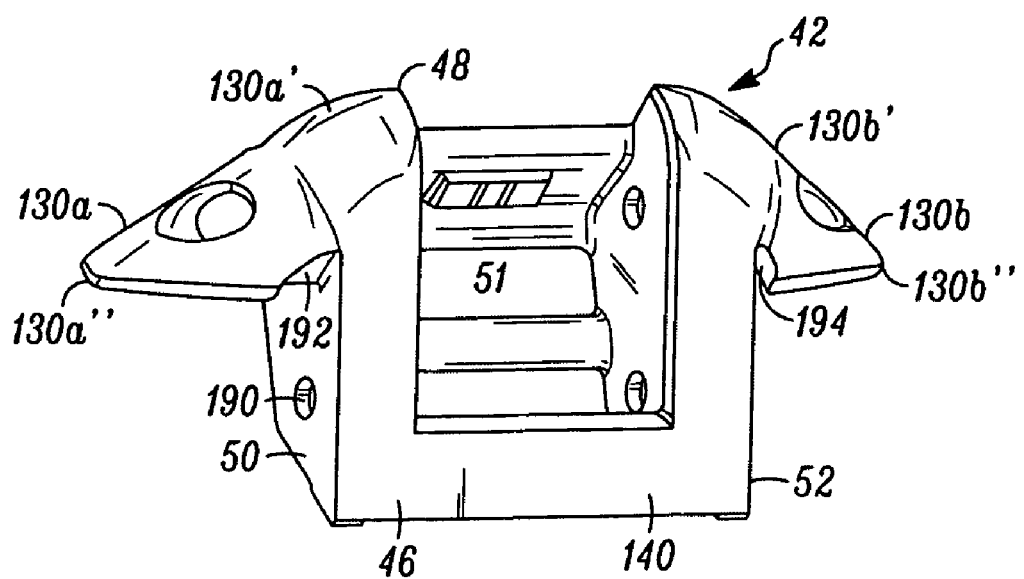
Figure 17:
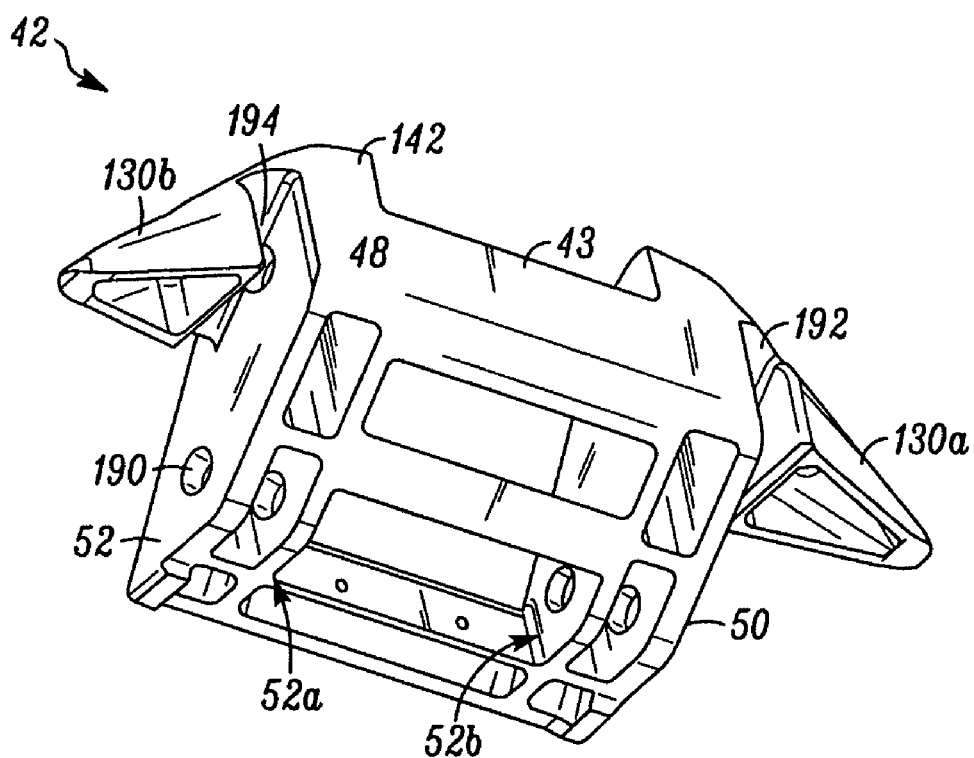

FIGS. 15 and 16 are perspective views of the body member 42 showing the details thereof. A pair of wing like members 130a and 130b are part of the legs 50 and 52, respectively, and extend outwardly therefrom. Each of the wing like members 130a and 130b have a downwardly sloping upper surface 130a' and 130b' terminating at a tip 130a" and 130b". The body member 42 has an outer surface 140 and an inner surface 43. The tips 130a" and 130b" of the wing like members 130a and 130b are, for the body member in the retracted position thereof, no higher than the top surfaces of the frame 30 when the body member is in the upright position thereof. When the body member 42 is positioned in the upright position and the pawl 44 is in the retracted position, loads of greater width or misaligned loads rather than the particular pallets to be retrained by the overrideable restraint 26 will slidingly engage the upper surface 130a or 130b and press the body member 42 into the retracted position thereof and slide thereover without damage to the pallet or to the overrideable restraint 26. After the passage of such pallets and, for example, the next pallet is the particular pallet to be restrained, the particular pallet may be moved into position with the pockets of the pallet aligned with the pawls 44 and the lock members 64 of the overrideable restraints 26 manually manipulated to release the pawls 44 for engagement with the pockets of the pallet.

When the pawl 44 is in the retracted position and the body member 42 is in the upright position, the front faces 43 of the of the transversely and longitudinally aligned body members 42 act as a guide to provide linear movement of the particular pallet to be retrained to prevent the twisting or rotational movement about a vertical axis.

The body axle 60 passes through apertures 190 in legs 50 and 52 of the body member 42. When the body member 42 is in the retracted position and contained within the cavity 40, the side members 36 and 38 fit into notches 192 and 194 in wings 130a and 130b.

When the particular pallet which is restrained by the restraints 26 is to be removed from the transport vehicle 12, the lock members 64 may be manually released from engagement with the shoulders 44a and 44b of the pawl 44 allow the pawl to move into the retracted position under the spring force of springs 120a and 120b and the lower tab 64c of the lock members 64 will engage the detent 54c" to restrain the pawls 44 in the retracted position. With the pawls 44 in the retracted condition and the body members 42 in either the upright or retracted position, other loads may be move longitudinally over the restraints 26.

In some applications of the present invention, it may be desirable to maintain the overrideable restraint 26 with the body member in the retracted position. This may be accomplished by providing an aperture in one of the side members 36 or 38 of the frame 30 and inserting a pin therethrough for engagement with the surface 140 of the body member or any other mechanism for the same purpose as controlled, for example, by lever 200. The pawl 44 may be in either the retracted position thereof or in the engagement position thereof. Such pin may be manually moved to allow the body member 42 under the influence of the spring force from the first set of springs 70a and 70b to be moved into the upright position.

Figure 7:
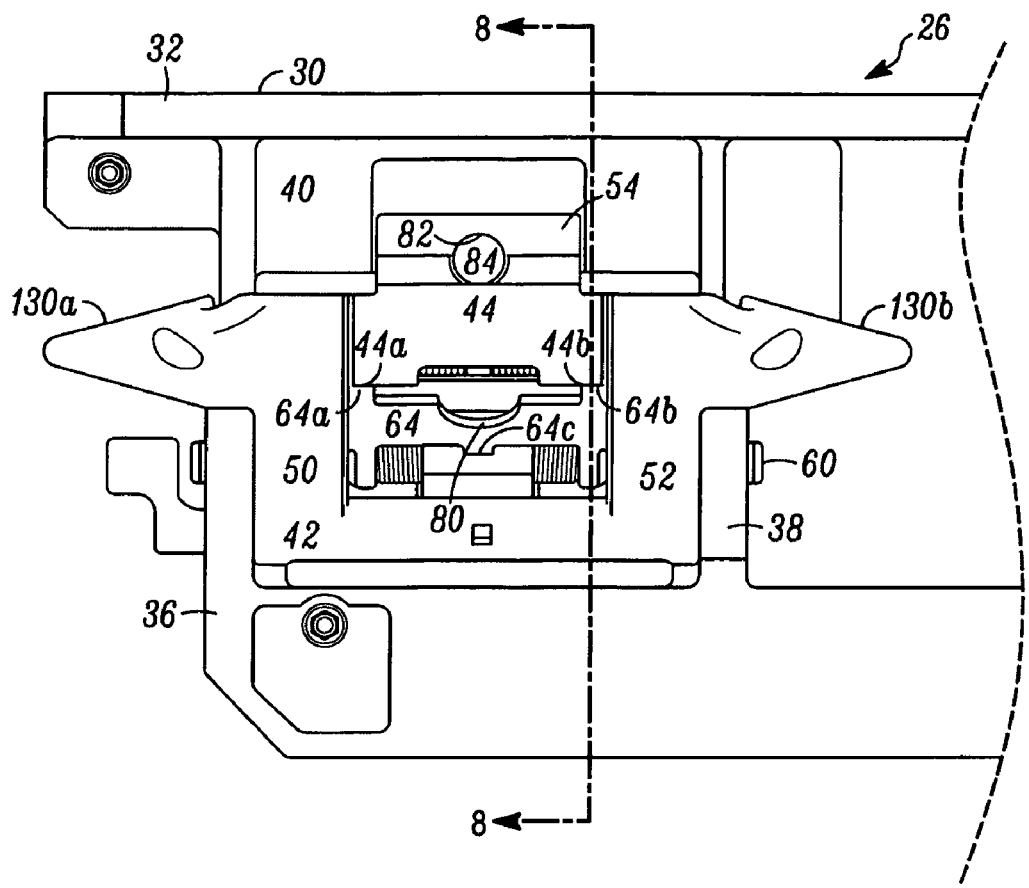
FIG. 7 illustrates the restraint of the present invention in the third position wherein the body member is in the upright position and the pawl is in the engagement position.
Figure 8:
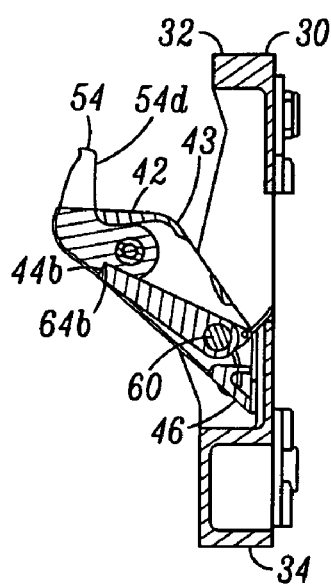
FIG. 8 is a sectional view along the line 8-8 of FIG. 7.
Figure 9:
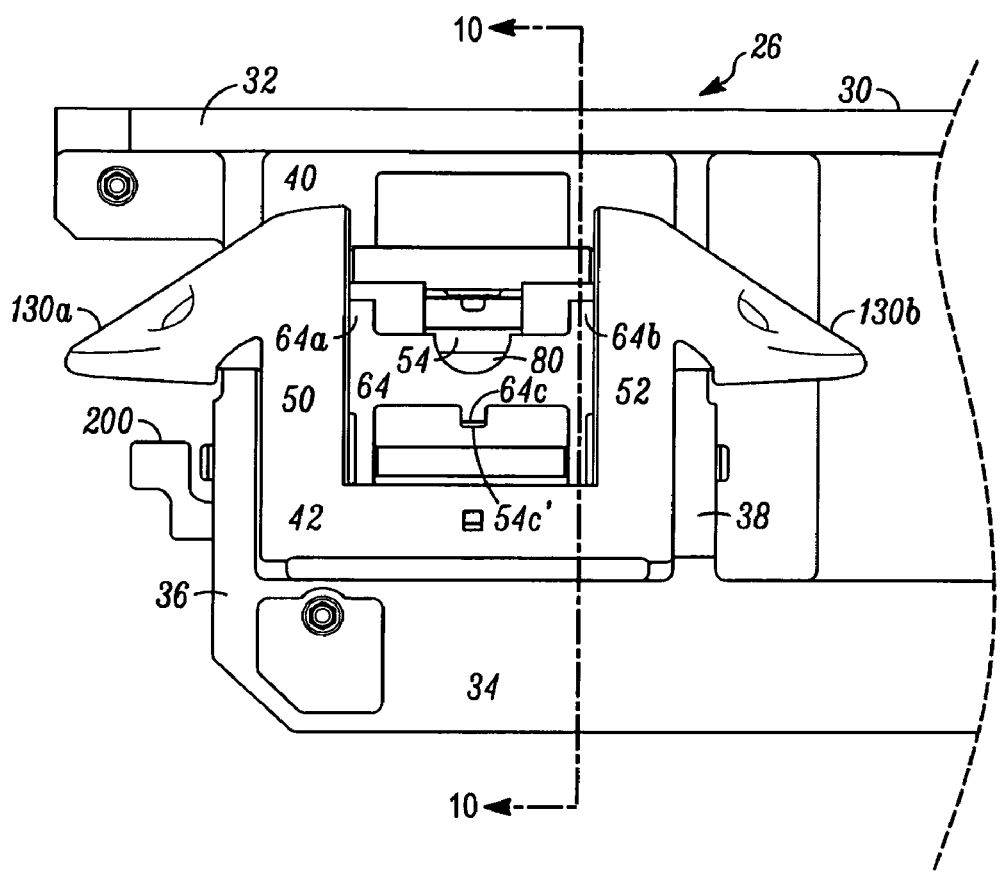
FIG. 9 illustrates the restraint of the present invention in the fourth position thereof wherein the body member is retracted into the frame and the pawl is retracted into the body member.
Figure 10:
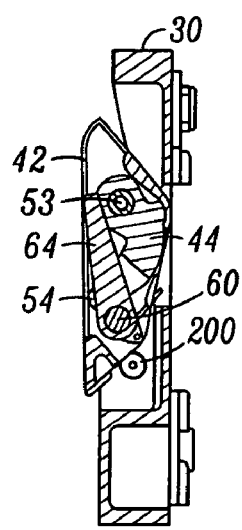
FIG. 10 illustrates the restraint of the present invention in the fourth position thereof wherein the body member is retracted into the frame and the pawl is retracted into the body member.

FIGS. 11 and 12 illustrate a restraint 26 according to the principles of the present invention engaging the particular pallet indicated at 210 that the restraint is designed to restrain on the cargo deck 12'. The pallet 210 has a plurality of longitudinally aligned pockets 212, of which one is shown in FIGS. 11 and 12. The pocket has a back wall 214, a pair of side walls 216 and 218 and a bottom wall 220. The restraint 26 is in position 3 as described above wherein the body member 42 is in the extended position and the pawl 44 is in the engagement position as shown in FIGS. 7 and 8. The bottom surface 54d of the lip 54 of the pawl 44 engages the bottom surface 220 of the pocket 212 and restrains movement of the pallet in the vertical direction as indicated by the arrow 222. The side surfaces 54a and 54b of the lip 54 of the pawl 44 engage and/or are in close proximity to the side surfaces 216 and 218 of the pocket 212. When particular pallets with pockets are to be installed, the restraints 26 must be in the position with the pawl retracted as in position 2 as shown on FIGS. 5 and 6 or in position 4 as shown on FIGS. 9 and 10. In either position, once the pallet is in place and the pockets 212 aligned with the restraints 26, the lock 64 may be manually moved to remove the tab 64c from engagement with the detent 54c of the pawl 54 and the springs 120 a and 120b will urge the pawl into the engagement position so the lip 54 of the pawl 44 is in the position as shown in FIGS. 11 and 12 with the lip 54 in the pocket 212 to restrain the pallet in both fore and aft directions but also vertical directions. When the particular pallet is to be removed, the lock 64 may be moved by grasping the aperture 80 and rotating the lock 64 in the direction indicted by the arrow 65 against the spring force of the springs 86 to disengage the tabs 64a and 64b of the lock 64 from the shoulders 44a and 44 of the pawl 44. The aperture 84 of the pawl may then be grasped to move the pawl against the spring force of the springs 120 until the tab 64c engages the detent 54c' on the lower surface 54d of the lip 54 of the pawl 44 to hold the restraint 26 in the position shown in FIGS. 5 and 6. The pallet may then be moved in the forward or aft direction to allow removal of the pallet from the aircraft.

According to the principles of the present invention, the restraints 26 as installed as shown in FIG. 1 may be utilized successfully not only for guiding and then restraining a particular pallet with pockets, but also, when so installed, may be utilized for pallets of the same transverse width as the particular pallets but without pockets therein. For such pallets of the same width as the particular pallet but without pockets, the transversely aligned and opposed restraints 26 as shown in FIG. 1 will have the forward faces 43 thereof act as guides and prevent transverse movement of the pallet. For such pallets without pockets but of the same width as the particular pallet, the restraints 26 may be in the position with the pawl in the engaged position as shown in FIGS. 3, 4, 7 and 8.

When loads of greater width than the particular pallet and/or misaligned loads, the restraint 26t may be in any of the positions 1, 2, 3 or 4 described above. Such load may slide into the aircraft in the forward or aft direction and the restraint 26 may be, for example, in the position with the body member in the upright position and the pawl in either the retracted or engaged position. The load as it slides along will first engage the wings 130a or 130b of the body member 42 and will force the body member down against the spring force of the springs 70 to either the position shown in FIGS. 3 and 4 or 9 and 10.

Form the above, it can be seen that there has been provided a unique pallet restraint device that may be used in an aircraft or other vehicle to restrain a particular pallet from both for and aft movement, transverse movement and vertical movement and still not interfere with the loading of loads other than the particular pallet and in may also act as a guide and to prevent transverse movement of certain other pallets or loads.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A load restraint comprising, in combination:
    a frame having a first mounting bar and a second mounting bar spaced from said first mounting bar, a first side member and a second side member spaced from said first side member, and said first side member and said second side member extending between said first mounting bar and said second mounting bar, said first side member, said second side member, said first mounting bar and said second mounting bar defining a body member receiving cavity therebetween;
    a body member pivotally mounted on said frame in said body member receiving cavity of said frame for pivotal movement between an upright position wherein said body member extends upwardly from said body member receiving cavity and a retracted position wherein said body member is substantially contained in said body member receiving cavity, said body member substantially rectangular having a base portion, a top portion spaced from said base portion and a pair of spaced apart leg portions extending between said top portion and said base portion and defining a pawl receiving cavity therebetween;
    a body member axle extending through said first side member and said second side member of said frame in regions adjacent said first mounting bar and through said pair of spaced apart leg portions of said body member in regions adjacent said base portion of said body member to provide said pivotal motion of said body member on said frame;
    first spring for biasing said body member into said upright position thereof and resisting movement of said body member into said retracted position thereof;
    a pawl pivotally mounted on said body member in regions adjacent said top portion thereof for pivotal movement between an engaged position and a retracted position, said pawl having:
        a lip portion extending outwardly from said body member toward said second mounting bar in said engaged position of said pawl and said lip portion having a load engaging lower surface, and said pawl having:
        a lower portion spaced from said lip portion;
        a first lock detent on said lower portion of said pawl; and,
        a second lock detent on said load engaging lower surface of said lip portion of said pawl; and,
    said pawl contained within said pawl receiving cavity in said retracted position thereof;
    a pawl axle extending through said pair of spaced apart leg portions of said body member in regions adjacent said top portion of said body member and through said lower portion of said pawl to allow said pivotal movement of said pawl;
    second spring for biasing said pawl into said engaged position thereof and resisting movement of said pawl into said retracted position;
    a lock member pivotally mounted on said body member axle between said spaced apart leg portions of said body member for pivotal movement towards and away from said pawl, said lock member having first tab for selectively and removably engaging said first lock detent on said pawl for said pawl in said engaged position thereof to prevent movement of said pawl from said engaged position to said retracted position thereof, and second tab for selectively and removably engaging said second lock detent of said pawl for said pawl in said retracted position thereof to prevent movement of said pawl from said retracted position thereof to said engaged position thereof;
    third spring for biasing said lock member towards said pawl and resisting movement of said lock member away from said pawl;
    a first wing member connected to a first of said pair of leg portions of said body member in regions adjacent said top portion of said body member and extending outwardly therefrom over said first side member of said frame and having a downwardly tapered upper surface extending from said first of said leg portions of said body member toward said frame, and a lower surface spaced from said top surface;
    a second wing member connected to the second of said pair of leg portions of said body member in regions adjacent said top portion of said body member and extending outwardly therefrom over said second side member of said frame and having a downwardly tapered upper surface extending from the second of said leg portions of said body member toward said frame, and a lower surface spaced from said top surface.

2. The arrangement defined in claim 1 and further comprising:
    a pin accepting aperture extending through one of said first and second side members of said frame;
    a pin removably positionable in said pin accepting aperture and selectively engaging said body member for the condition of said body member in said retracted position thereof to prevent pivotal motion of said body member from said retracted position to said up right position.

3. The arrangement defined in claim 1 wherein:
at least one of said first spring, said second spring and said third spring is a torsion spring.

4. The arrangement defined in claim 3 wherein:
each of said first spring mean, said second spring means and said third spring means is a torsion spring.

5. The arrangement defined in claim 4 and further comprising:
a pin accepting aperture extending through one of said first and second side members of said frame;
a pin removably positionable in said pin accepting aperture and selectively engaging said body member for the condition of said body member in said retracted position thereof to prevent pivotal motion of said body member from said retracted position to said up right position.

6. The arrangement defined in claim 1 wherein:
said bottom surface of each said first and said second wing members has walls defining a notch therein, and
a preselected portion of said first side member of said frame fitting into said notch of said bottom surface of said first wing member for said body member in said retracted position thereof;
a preselected portion of said second side member of said frame fitting into said notch of said bottom surface of said second wing member for said body member in said retracted position thereof.

7. The arrangement defined in claim 1 and further comprising:
said lock member being generally H shaped having a pair of spaced apart side elements each having a outer end and a inner end, and a cross bar element extending between said side elements;
said body member axle extending through said spaced apart side elements in regions adjacent said inner ends thereof;
said outer ends of said pair of spaced apart side elements having said first tab means;
said cross bar element having said second tab means.

8. The arrangement defined in claim 1 wherein:
each of said first spring, said second spring and said third spring is a torsion spring;
said first spring has a first end engaging said frame and a second end engaging said body member;
said second spring has a first end engaging said body member and a second end engaging said pawl;
said third spring has a first end engaging said body member and a second end engaging said lock member.

9. The arrangement defined in claim 1 and further comprising:
said first lock detent on said pawl having a first wall for engaging said first tab of said lock member for said pawl in said engaged position and a second wall on said first lock detent for engaging said first tab for said pawl in said retracted position.

10. The arrangement defined in claim 9 and further comprising:
a pin accepting aperture extending through at least one of said first and second side members of said frame;
a pin removably positionable in said pin accepting aperture and selectively engaging said body member for the condition of said body member in said retracted position thereof to prevent pivotal motion of said body member from said retracted position to said up right position.

11. The arrangement defined in claim 10 and further comprising:
said bottom surface of each said first and said second wing members has walls defining a notch therein, and
a preselected portion of said first side member of said frame fitting into said notch of said bottom surface of said first wing member for said body member in said retracted position thereof;
a preselected portion of said second side member of said frame fitting into said notch of said bottom surface of said second wing member for said body member in said retracted position thereof;
whereby force exerted on said upper surfaces of said first and second wing members moves said body member from said upright position thereof to said retracted position thereof.

12. The arrangement defined in claim 11 wherein:
said top portion of said body member engages said load engaging lower surface of said pawl to limit pivotal rotation thereof for said pawl in said engaged position.

13. A load restraint comprising, in combination:
a frame, said frame having walls defining a body member receiving cavity;
a body member pivotally mounted on said frame in said body member receiving cavity of said frame for pivotal movement between an upright position and a retracted position;
a body member axle extending through said frame and said body member to provide said pivotal motion of said body member on said frame;
first spring for biasing said body member into said upright position thereof and resisting movement of said body member into said retracted position thereof;
a pawl pivotally mounted on said body member thereof for pivotal movement between an engaged position and a retracted position, said pawl having:
a lip portion extending outwardly from said body member in said engaged position of said pawl and said lip portion having an upper surface and a load engaging lower surface, and said pawl having:
a lower portion spaced from said lip portion;
a first lock detent on said lower portion of said pawl; and,
a second lock detent on said load engaging lower surface of said lip portion of said pawl; and,
a pawl axle extending through said body member in regions adjacent and through said pawl to allow said pivotal movement of said pawl;
second spring for biasing said pawl into said engaged position thereof and resisting movement of said pawl into said retracted position;
a lock member pivotally mounted on said body member axle for pivotal movement towards and away from said pawl, said lock member having first tab for selectively and removably engaging said first lock detent on said pawl for said pawl in said engaged position thereof to prevent movement of said pawl from said engaged position to said retracted position thereof, and second tab for selectively and removably engaging said second lock detent of said pawl for said pawl in said retracted position thereof to prevent movement of said pawl from said retracted position thereof to said engaged position thereof;
third spring for biasing said lock member towards said pawl and resisting movement of said lock member away from said pawl;
a first wing member connected to said body member and extending outwardly therefrom in a first direction and having a downwardly tapered upper surface;

a second wing member connected to said body member and extending outwardly therefrom in a second direction opposite said first direction and having a downwardly tapered upper surface.

14. The arrangement defined in claim 13 and further comprising:
a pin removably mounted on said frame and extending through said frame and engaging said body member for said body member in said retracted position to prevent pivotal movement of said body member from said retracted position to said upright position.

15. The arrangement defined in claim 13 wherein:
each of said first, said second and said third spring means comprises a torsion spring.

16. The arrangement defined in claim 13 wherein:
said lock member is generally H shaped having a pair of spaced apart side elements each having a outer end and a inner end, and a cross bar element extending between said side elements;
said body member axle extending through said spaced apart side elements in regions adjacent said inner ends thereof;
said outer ends of said pair of spaced apart side elements having said first tab means;
said cross bar element having said second tab means.

17. The arrangement defined in claim 16 and further comprising:
said first lock detent on said pawl having a first wall for engaging said first tab of said lock member for said pawl in said engaged position and a second wall on said first lock detent for engaging said first tab for said pawl in said retracted position.

18. The arrangement defined in claim 13 wherein:
said body member engages said pawl for said pawl in said engagement position thereof to limit pivotal rotation of said pawl for said pawl in said engaged position.

* * * * *

UNITED STATES PATENT AND TRADEMARK OFFICE
CERTIFICATE OF CORRECTION

PATENT NO. : 8,221,038 B1  
APPLICATION NO. : 12/660396  
DATED : July 17, 2012  
INVENTOR(S) : Edward Moradians It is certified that error appears in the above-identified patent and that said Letters Patent is hereby corrected as shown below:

On the Title Page

Left column, item (73), replace "Angra International, LLC.," with --Ancra International, LLC.,--.

Signed and Sealed this  
Twenty-sixth Day of November, 2013

Margaret A. Focarino  
*Commissioner for Patents of the United States Patent and Trademark Office*